(12) United States Patent
Lee et al.

(10) Patent No.: US 7,287,216 B1
(45) Date of Patent: Oct. 23, 2007

(54) DYNAMIC XML PROCESSING SYSTEM

(75) Inventors: Wai-Kwong (Sam) Lee, Nashua, NH (US); Marco Carrer, Nashua, NH (US); Alok Srivastava, Chelmsford, MA (US); Paul Lin, Nashua, NH (US); Cheng Han, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 685 days.

(21) Appl. No.: 09/583,245

(22) Filed: May 31, 2000

(51) Int. Cl.
*G06F 7/06* (2006.01)
*G06F 7/08* (2006.01)
*G06F 7/00* (2006.01)
*G06F 19/00* (2006.01)

(52) U.S. Cl. .......................... 715/513; 707/3

(58) Field of Classification Search ................ 707/1–4, 707/10, 100, 101, 104.1, 523; 715/509, 513, 715/523
See application file for complete search history.

(56) References Cited

U.S. PATENT DOCUMENTS

| | | | |
|---|---|---|---|
| 6,584,459 B1 * | 6/2003 | Chang et al. ................. | 707/3 |
| 6,643,633 B2 * | 11/2003 | Chau et al. .................... | 707/1 |
| 6,684,222 B1 * | 1/2004 | Cornelius et al. ......... | 707/104.1 |
| 2002/0123993 A1 * | 9/2002 | Chau et al. ................... | 707/5 |
| 2002/0156811 A1 * | 10/2002 | Krupa ......................... | 707/513 |
| 2002/0169788 A1 * | 11/2002 | Lee et al. ................ | 707/104.1 |
| 2003/0005410 A1 * | 1/2003 | Harless ....................... | 717/114 |
| 2003/0167213 A1 * | 9/2003 | Jammes et al. ............... | 705/27 |

OTHER PUBLICATIONS

Krupa, U.S. Appl. No. 60/206,325, filed May 23, 2000.*
Lee et al., U.S. Appl. No. 60/182,939, filed Feb. 16, 2000.*
"Why Xquery?", DataDirect Technologies, available at http://www.datadirect.com/developer/xquery/getting_started/why_xquery/index.ssp (via HotBot search engine) (publication criteria: prior to May 31, 2000).*
DBIx::DBStag—Relational Database to Hierarchical Mapping, available at http://cpan.uwinnipeg.ca/htdocs/DBIx-DBStag/DBIx/DBStag.html (via HotBot search engine) (publication criteria: prior to May 31, 2000).*

(Continued)

*Primary Examiner*—Heather R. Herndon
*Assistant Examiner*—Paul H. Nguyen-Ba
(74) *Attorney, Agent, or Firm*—Roger Kennedy

(57) ABSTRACT

A system for storing and dynamically updating data represented in the Extensible Markup Language (XML) which separates the data values in at least some of the elements of an XML document and places those data values in relational database tables where they may be processed using conventional RDBMS techniques. The hierarchical structure of the XML document is saved separately in an XML skeleton object from which element data other than primary key values has been removed. The XML documents document type definition (DTD) is stored, along with additional property data used the RDBMS, in an XML Definition object. The additional property information includes the identification of primary key data values which are used to link the structural definition data to the value data stored in the tables, the designation of data types used for more efficient storage of data from predetermined XML elements, the designation of selected element data for indexing and for column storage, and the designation or relational integrity constraints which help insure that logically connected data is not inappropriately deleted or updated. The XML data as stored in the relational tables can be retrieved as a complete XML document, or selected XML elements can be retrieved by themselves, by merging the table data into the XML skeleton.

12 Claims, 3 Drawing Sheets

OTHER PUBLICATIONS

Leigh Dodds, Storing and Querying, XML.com, available at http://www.xml.com/lpt/a/2000/04/05/deviant/index.html (via HotBot search engine) (publication criteria: prior to May 31, 2000).*

Jayavel Shanmugasundaram et al., "A General Technique for Querying XML Documents using a Relational Database System", SIGMOD Record, vol. 30, No. 3, Sep. 2001, pp. 20-26.*

* cited by examiner

```xml
<?xml version="1.0" standalone="yes"?>
  <?xml-stylesheet type="text/css" href="shortform.css"?>
    <patent>
      <country>U.S.</country>
      <patno>5,123,456</pateno>
      <inventors>
        <inventor>
          <lastname>Jones</lastname>
          <firsname>Arthur J.</firstname>
          <city>Arlington</city>
          <state>VA</state>
          <citizenship>U.S.</citizenship>
        </inventor>
        <inventor>
          <lastname>Masterson</lastname>
          <firsname>Bradley J.</firstname>
          <city>Washington</city>
          <state>DC</state>
          <citizenship>U.S.</citizenship>
        </inventor>
      </inventors>
      <title>Method for processing and packaging rice products</title>
      <status>Granted</status>
    </patent>
```

70

75 country
U.S. — 81 patno
5,123,456 — 83

87 inventors

| lastname | firstname | city | state | citizenship |
|----------|-----------|------------|-------|-------------|
| Jones | Arthur J. | Arlington | VA | U.S. |
| Masterson | Bradley J. | Washington | DC | U.S. | title  85

Method for processing and packaging rice products status  86

Granted

Fig. 1

DYNAMIC XML PROCESSING SYSTEM

FIELD OF THE INVENTION

This invention relates to relational database management systems and, more particularly, to methods and apparatus for employing a relational database management system for storing and retrieving data expressed in Extensible Markup Language (XML).

BACKGROUND OF THE INVENTION

The relational database model provides a readily understood framework for representing, organizing and manipulating business data. Since its formal introduction by Dr. E. F. Codd in 1970 in the paper entitled "A Relational Model for Large Shared Data Banks," CACM 13(6) June, 1970, the popularity of relational technology has increased dramatically. Today, most organizations implement relational echnologies in some form, and highly effective relational database management systems (RDBMS) are available at low cost for many platforms.

In very recent years, a very different framework for representing data was created so that richly structured documents could be used over the World Wide Web. Called the "Extensible Markup Language" (XML), this new standardized data representation was developed by a group formed under the auspices of the World Wide Web Consortium (W3C) in 1996, with the goals of creating a data model that would be easy to use over the Internet, would support a wide variety of applications, and would be formal and concise. Because of these and other attributes, XML is now being universally adopted as a standard data representation which is particularly suitable for exchanging data between disparate organizations and applications.

While database systems have been and are being developed which are specifically designed to store and retrieve XML data in its native form, there is a significant need for a mechanism which would permit XML data to stored and manipulated using existing relational database systems. By doing so, XML data might be more easily used in combination with the vast amounts of data that already exist in relational systems, powerful capabilities built into relational systems could be advantageously applied to XML data, and business-to-business data which are increasingly being exchanged in the form of XML documents could be dynamically stored and retrieved using existing relational database installations.

Unfortunately, XML data cannot be directly translated into relational form for storage in existing relational or object-relational systems. XML data is highly hierarchical, allowing it to represent data in deeply nested relationships which do not match well with the tables (relations) used by a conventional RDBMS. While XML permits and indeed encourages the organization of data into arbitrarily complex and heterogenous hierarchical structures, the relational model encourages the organization of data into well-defined tables containing typed data in defined columns and rows of tables, with defined relationships between tables. As a consequence, XML data is often structured in ways that can be mapped only with difficulty, if at all, into the relational model and, at the same time, may fail to conform to the data type and homogeneity requirements needed by an RDBMS.

SUMMARY OF THE INVENTION

It is accordingly a principal object of the invention to use a relational database system to dynamically store both the data content and the structure of XML documents, and to retrieve and reconstruct XML documents and the XML elements they contain using relational and XML queries.

In a principle aspect, the present invention takes the form of methods and apparatus for storing XML documents in a relational database system by processing each XML document, including any document type definition (DTD) for that document, to separately store the structure and the data for the XML document. The structure is stored in and defined by a new data type, which is preferably expressed in XML, while the data content of the elements of the XML document is separately stored using a conventional relational database schema.

In accordance with the invention, an XML data element which contains no sub-elements (here called a "leaf element") is stored as a field (column) in a row. An XML element that contains one or more leaf elements (here called a "one-level element") corresponds to and is stored as a row in the relational schema. An XML element that contains one or more one-level elements is called a "general element" and can contain other general elements in addition to one-level elements. A general element corresponds to an ordered list of rows in a heterogeneous relational schema. Thus, the one-level elements are used to represent the data contained in an XML document while the tree of general elements which represents the document's structure is stored separately as a structure-defining XML document.

The structure-defining information preferably consists of an "XML skeleton" formed by stripping the data value characters from the XML document, so that the content and positional placement of the element tags and other components of the original XML data are retained to define its structure, but the data values themselves are placed in relational tables to permit them to be used in relational database operations, including operations which dynamically modify the data so that, when the structural data in the XML skeleton is later merged with the value data from the relational tables, the resulting XML document reflects the results of the relational operations.

Preferably, means are further employed to store property data which characterizes the value data stored in the relational tables. For example, at least one or more data values should be designated as primary keys. Those primary key values are stored in the relational tables and also retained in the skeleton to permit relational join operations to link the structural information to the value data in the tables, and vice versa. In addition, property information which designates selected data values for indexing, column storage, and the like may be advantageously stored in an XML descriptor record. Selected XML elements may be designated as containing "static" data which need not or should not be used or modified by relational operations, and the data value in such static elements is thus retained in its original form in the skeleton, but is not placed in relational tables. The XML descriptor record can so advantageously store (and extend) the document type definition (DTD) for the XML document and this data may be used to reconstruct the DTD and to validate the XML document before storage and after reconstruction. In addition, referential integrity constraints can be stored an used in conventional fashion by the relational database system to manage updates and deletions to data values which are logically related to other data values.

The invention thus permits the powerful capabilities of a relational database to be applied to the data in XML documents. Data transported between disparate computer systems in XML form may be inserted into relational tables, dynamically modified, used in combination with other data, and reconstructed in XML form for external use. The XML data as stored in the relational database can be retrieved as a complete XML document, or selected XML elements can be retrieved by themselves for processing, or used within other XML documents. Selected XML elements in the database can be dynamically updated and later merged into the XML skeleton thereby permitting a stored XML document to be dynamically updated as desired using relational database operations.

These and other objects, features and advantages of the present invention may be better understood by considering the following detailed description of a specific embodiment of the invention. In the course of this description, frequent reference will be made to the attached drawings.

BRIEF DESCRIPTION OF THE DRAWINGS

FIG. 1 illustrates the manner in which data values found in the elements of an XML document are stored in the rows of RDBMS tables as contemplated by the invention;

DETAILED DESCRIPTION

Figure 2:
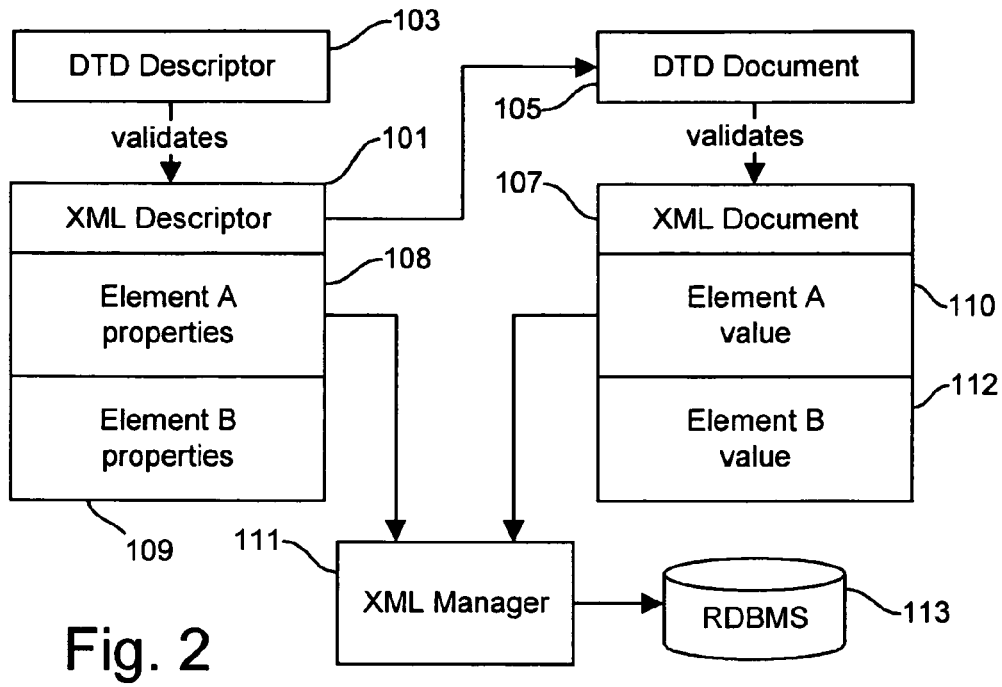
FIG. 2 is a block diagram illustrating the relationship and process flow employed to separately store the data values and the structure of an XML document in a relational database.

The methods and apparatus contemplated by the present invention store and retrieve XML document data using conventional relational database management systems. Both relational database systems and XML are described in detail in the literature. See, for example, the *Handbook of Relational Database Design* by Candace C. Fleming and Barbara von Halle, ISBN 0201114348, Addison-Wesley Publishing Company (1989) which provides a comprehensive discussion the design and use of relational database systems. Specific commercial relational database management systems are individually documented; for example, see *Oracle8: The Complete Reference* by George Koch and Kevin Loney, ISBN 007882396X, Osborne/McGraw-Hill 1997. XML, in its present form, is completely described in and defined by the World Wide Web Consortium Recommendation dated Feb. 10, 1998 entitled "Extensible Markup Language (XML) 1.0," which may be found on the World Wide Web at the URL http://www.w3.org/TR/1998/REC-xml-19980210, and which has been reproduced in many explanatory publications, such as the *XML Bible* by Elliotte Rusty Harold, ISBN 0764532367, IDG Books Worldwide (1999).

In accordance with the invention, an element in an XML data document which contains no sub-elements (a "leaf element") is stored as a field (column) in a row whereas an XML element that contains one or more leaf elements (a "one-level element") corresponds is stored as a row in a relational database table. An XML element that contains one or more one-level elements is called a "general element" and can contain other general elements in addition to one-level elements. When a general element contains both one-level elements and leaf elements, the leaf elements can be treated as one-level elements which happen to contain only leaf element. A general element corresponds to an ordered list of rows in a heterogeneous relational schema. Thus, the one-level elements are used to represent the data contained in an XML document while the tree of general elements which represents the document's structure is stored separately as a structure-defining XML document.

The relationship between the elements of an XML document and the corresponding RDBMS schema is illustrated by example in FIG. 1. An XML document seen at 70 is mapped into the RDBS schema shown within the dashed-line rectangle 75. The root element "<patent>" of the XML document 75 is a general element which contains the leaf elements "<country>," "<patno>," "<title>," and "<status>." and a general element "<inventors>" which contains two one-level "<inventor>" elements, each of which contain the leaf elements "<lastname>," "<firstname>," "<city>," "<state>," and "<citizenship>."

The data contained in these elements is mapped into an ordered list of rows in the RDBMS schema 75. The data value "U.S." in the "<country>" element of the XML document 70 is stored in a table row named "country" seen at 81. Simlarly, the data value "5,123,456" is stored in the row named "patno" at 83, the data value "Method for processing and packaging rice products" in the element "<title>" is stored in the row named "title" at 85, and the data value "Granted" is stored in the row named "status" at 86. Rows 81, 83, 85 and 86 are placed in single column rows in the ordered list of rows which also includes the multi-column "inventor" rows whose columns (fields) store the data from the leaf elements "<lastnamethe datawithin the general elements "<lastname>," "<firstname>," "<city>," "<state," and "<citizenship>" as indicated generallin at 87 in FIG. 1. As described in more detail later, the placement of the from the XML document in relational tables allows queries to be executed to retrieve particular XML documents (e.g. patent where "lastname"="Masterson"), and to dynamically update selected elements (e.g., by replacing "Granted" with "Expired" in the row named "status").

As specified in the XML Recommendation, the structure and content of an XML document may advantageously be defined by a document type definition (DTD) which can be included in the same file that contains the described XML document. Alternatively, the DTD can be stored separately at a uniform resource location (URL) referred to in the XML document. A DTD lists the elements, attributes and other components which the described XML document may contain, and the relationships these elements have to one another. A DTD provides a set of rules to which a valid XML document must conform, including the parent-child relationship between elements. A DTD shows how the different elements of an XML document are structured without providing any actual data.

A DTD as defined by the XML recommendation does not, however, provide sufficient information about the described XML document to permit that document to be readily stored in an relational database. The DTD provides no built-in mechanism for describing the data type of data contained in an XML element or attribute, nor does a DTD specify which elements of a document should act as keys, or be indexed, or be subject to column storage. Consequently, the present invention employs an "XML Descriptor" which is a superset of a DTD containing additional properties useful for the storage and retrieval of XML documents using a relational database. Each XML descriptor defines a new XML document type.

The relationship between an XML Descriptor, the XML document it describes, and the XML document's DTD is shown in FIG. 2 of the drawings. Each XML Descriptor 101 is itself an XML document and follows a syntax specified in the XML Descriptor's DTD 103. A conventional DTD 105 is generated from the XML Descriptor. The document DTD 105 can be used to validate the XML document seen at 107, while the descriptor DTD 103 validates the XML Descriptor 101.

The XML Descriptor 101 imposes a specific set of rules on the syntax of the XML it describes:

1. The Descriptor declares the elements an XML document can contain. Those elements must be leaf elements of the XML tree. Thus, in the illustrative example shown in FIG. 1, the XML Descriptor would declare the leaf elements "<country>," "<patno>," "<title>," "<status>," "<lastname>," "<firstname>," "<city>," "<state," and "<citizenship>."

2. Leaf elements declared in the XML Descriptor have a data type and other properties associated with them, as illustrated at 108 and 109 in FIG. 2. In particular, at least one of the elements must have a "Primary Key" property associated with it. Other properties, such as "ColumnStorage," "Indexed," and relational integrity constraints may be associated with more than one of the elements defined by the XML Descriptor 101, as discussed later. These additional properties stored in the XML Descriptor 101 are used during the process of separating the structure and content of an XML document, and make it possible to identify which data to isolate. In the illustrative example of FIG. 1, the elements "<country>" and "<patno>" could have the property "PrimaryKey" set and the elements "<lastname>" and "<firstname>" have the "Indexed" property. The data values in the primary key elements are both stored both in relational data tables and are retained in an XML skeleton as discussed below.

3. An XML Descriptor declares the XML document type that can be aggregated into the current document, and cardinality attributes for this aggregation can also be identified.

4. An XML Descriptor can express a single inheritance relationship between XML document types. Child document types inherit the element definitions contained in their parents, but these definitions may be overridden in the child's descriptor.

5. An XML Descriptor provides information about the storage locations used within a relational schema. This information is used during storage and retrieval of those elements within an XML document that will be exported to the relational model. By way of example, an XML Descriptor may supply the name of a table or view whose column values are mapped by name to the values in correspondingly named XML elements.

As shown in FIG. 2, an XML Manager component 111 combines data which is "isolated" from the XML document 107 and stores it in a designated relational view or table of a database 113 as specified by the XML Descriptor 101. The structure of the XML document 107 is stored in the database 113 as an "XML skeleton" which is captured in and forms part of an ODXML object (to be described). The values of the isolated elements, as illustrated at 110 and 111 in FIG. 2, are not part of the skeleton, but are instead separately stored in the RDBMS table(s), thus avoiding data replication. Thus, the skeleton for the illustrative XML document 70 shown in FIG. 1 contains the same characters as the XML document 70, but with the data values omitted. Thus, in the example, the element reading "<city>Arlington</city>" in the XML document would appear as "<city></city>" in the skeleton. The data value "Arlington" is placed in the "city" column in a row of an "inventor" row of a database table as illustrated at 87 in FIG. 1, and is reinserted into the skeleton when the XML document is retrieved. A copy of the values of those elements with a "PrimaryKey" property are, however, stored in the skeleton to act as a reference which can be used during retrieval, as well as being stored in the RDBMS data tables.

Figure 3:
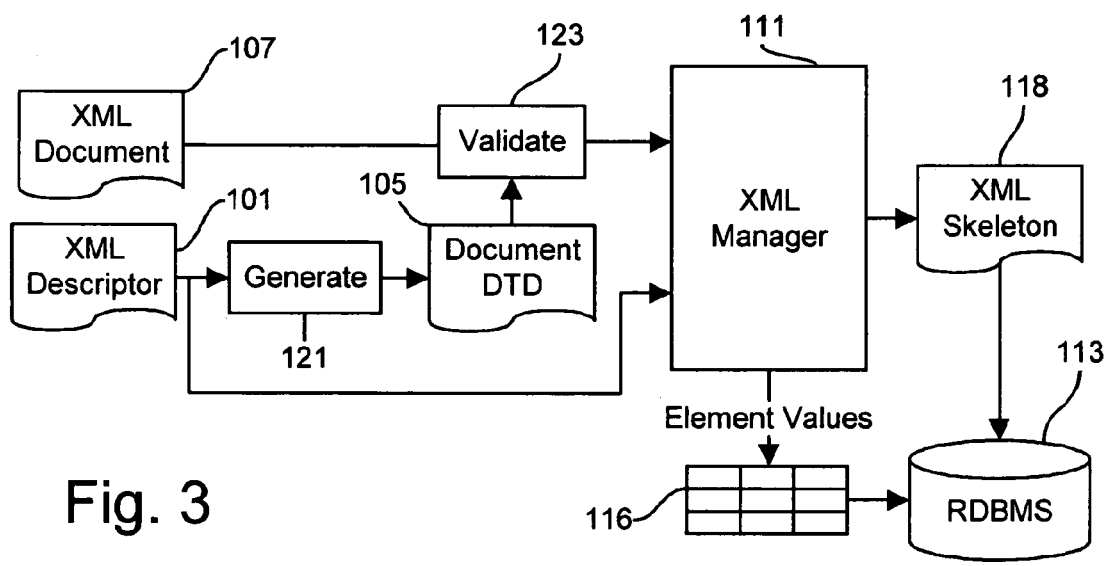
FIG. 3 is a flow diagram showing the manner in which an XML document is stored in a RDBMS using the information stored in an XML Descriptor.

FIG. 3 of the drawings illustrates the process of uploading an XML document into the database. The same reference numerals are used in FIGS. 2 and 3 to designate the same components. The XML Descriptor 101 is processed at 121 to generate the DTD 105 which is used at 123 to validate the XML document 107. The validated XML document 107 and the structural information contained within the XML Descriptor 101 are used by the XML Manager 111 to separately store the XML skeleton 118 and the XML data 116 in the RDBMS 113.

In order to store the XML data and structure information, the RDBMS employs a schema having several components. In the illustrative embodiment described here, the schema includes objects which are defined within an object-relational database, such as Oracle8, as described in Chapter 4, "The Basics of Object-Relational Databases," *Oracle8: The Complete Reference*, supra. Two new object types are defined: the first of which stores XML Descriptors and the second of which stores XML skeletons. The XML Descriptor object holds the name (stored as "wide character" data using the Oracle VARCHAR2 data type, a character large object (CLOB) which stores the characters making up the XML Descriptor, and a second CLOB which holds the document DTD generated from the XML Descriptor. The second new object which is defined is here called the ODXML object and consists of a CLOB holding the XML skeleton and a reference REF(XMLDescriptor) to the XML Descriptor object associated with the XML skeleton.

To improve performance, the XML Descriptor object may be replaced by or implemented by a more structured datatype, such as nested tables, which make one or more important fields within the XML Descriptor directly available, whereas access to other fields of the XML Descriptor may continue to require parsing the characters in the descriptor CLOB.

When XML documents are stored in the RDBMS, their XML Descriptors are preferably stored in a dictionary. As discussed above, each document is stored in an ODXML object table which contains a reference to its associated XML Descriptor. XML documents having the same structure create ODXML objects which refer to the same XML Descriptor.

Figure 4:
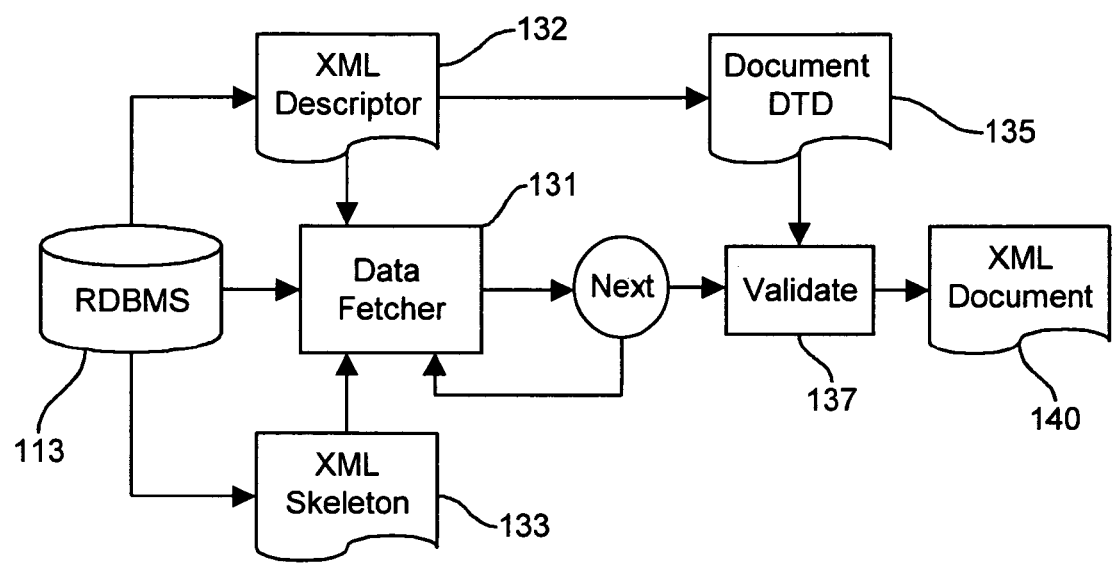
FIG. 4 is a flow diagram illustrating how an XML document which has been stored in an RDBMS system is retrieved and reconstructed.

The retrieval process is illustrated in FIG. 4 of the drawings and is the reverse of the upload process shown in FIG. 3. The data values previously isolated and stored in the RDBMS 113 are retrieved from their corresponding tables and merged back into the XML skeleton to reconstruct the original XML document. A "data fetcher" routine shown at 131 in FIG. 4 fetches the XML skeleton 133 which forms part of the ODXML object stored in the RDBMS 113. Using the reference also stored in the ODXML object, the data fetcher 131 also retrieves the XML Descriptor 132 which contains information on the location and properties of data values stored in relational tables in the RDBMS which are merged into the XML skeleton 133. The resulting XML document data may then be validated against a DTD 135 for the document gemerated from the XML Descriptor 132 as shown at 137.

Note that the separately stored data values in the RDBMS tables may be dynamically updated using conventional RDBMS mechanism. In the example of FIG. 1, the XML element "<status>" might be updated from its original value "Granted" (extracted from the original XML document) to a new value "Expired." When the XML document is reconstructed upon retrieval, it will have the original structure (as defined by the XML skeleton) but will contain the latest data stored in the database. The user may define which elements of the XML document can be dynamically updated and which should be static. The values in static elements are simply retained in their original form in the XML skeleton whereas the values of dynamic elements are removed from the skeleton and placed in the updatable RDBMS tables.

As discussed above, an XML document is represented within the RDBMS in two parts: the data values placed in rows, and the structure of the document with foreign keys identifying the basic data. As a result, accessing the value of an element, crucial in the performance of a query, can be represented by a join of that table of basic data and the table of XML structures. For example, a query condition which states:

T.project.person.lastname="Johnson"

can be re-written as

PersonTable.lastname='Johnson' and PersonTable.uid=T.project.person.uid assuming that uid is the primary key of PersonTable and a foreign key in the XML structure table. The condition statement T.project.person.uid=PersonTable.uid can be rewritten as a function as follows:

T.getIntegerValue('project.person.uid')=PersonTable.uid

The getIntegerValue function actually walks through (parses) the XML document tree in the stored XML skeleton to get the uid value. As stated earlier, primary key values are stored in the XML skeleton whereas dynamic data values which are not primary keys are only stored in the RDBMS tables. The getIntegerValue function is a method of the OCXML object, which should also provide (at least) a getStringValue(path) method. These two methods should be sufficient for accessing the values of most types of primary keys in XML documents.

For more rapid processing, an index can be built to eliminate the need to walk through the XML skeleton each time a primary key value is needed. As a result, a query which, for example, selects all projects where the lastname="Smith" can be represented by the following SQL statement (which begins with a call to the "constructXML( )" method that recontructs an XML document from the ODXML object by replacing the one-level elements expressed in the XML skeleton with the data values from rows specified by key values retained in the skeleton):

SELECT XML_TABLE.doc.constructXML( )
FROM XML_TABLE, PersonTable
WHERE PersonTable.lastname='Smith'
AND PersonTable.uid=XML_TABLE.getIntengerValue ('project.person.uid');

If the functional index cannot be optimized, or support for other primary key types besides Integer and String types is required, a second method can be used to avoid the need to parse the XML skeleton to obtain the key value. It can be stored in a supporting table as illustrated below:

| docid | path | value | basic table data |
|---|---|---|---|
| 1 | project.person.uid | 32454 | PersonTable |
| 3 | project.id | Xm182 | ProjectTable |
| 2 | project.person.uid | 23094 | PersonTable |
| ... | ... | ... | ... |

Here, the expression

T.project.person.uid can be rewritten as:

T_Support.docid t.docid

AND T.Support.path='project.person.uid'

AND T.value=PersonTable.uid

The complete SQL query can be written with the following syntax:

SELECT XML_TABLE.doc.constructXML( )
FROM XML_TABLE, PersonTable
WHERE PersonTable.lastname='Smith' AND PersonTable.uid=
XML_TABLE Support.docid=XML_TABLE.id
AND XML_TABLE-Support.path='project.person.uid'
AND .XML_TALBE_Support.

If query rewrite can be used, regardless of whether methods (functions) or support tables are employed, the query can be represented to users in a more natural form as follows:

SELECT XML_TABLE.doc.constructXML( )
FROM XML_TABLE, PersonTable
WHERE T.project.person.lastname='Smith'

The SELECT statements in the example above call the method "constructXML( )" to reconstruct the entire XML document. When it is instead desired to return only an element within the XML document, a "path" parameter is passed to using the call "constructXML(path)" so that the XML skeleton is parsed and returns only that part of the XML document specified by the path, with the one-level elements in a designated subtree portion of the entire XML document being returned. Since a path can represent multiple subtrees, a call to "constructXML(path)" can return a set of XML elements.

When it is desired to delete XML documents or to delete elements from designated documents, referential integrity must be preserved. RDMS systems typically include mechanisms for preserving referential integrity to guarantee that values from one column properly depend upon values from another column. Referential integrity is enforced in the RDBMS through integrity constraints which identify columns which contain foreign keys in one column or columns whose vales are based on key values from another table. When the element data in an XML document is stored in an RDBMS, users should have the ability to specify referential constraints. In this way:

1. When a row representing a one-level element in an XML document is deleted, the constraint should specify whether the associated XML document should be deleted in its entirety, or whether the RDBMS should reject the deletion. In general, since the data being deleted is part of an XML document, the system default should be to reject the deletion unless the user specifies otherwise.

2. When and XML object is deleted, the user should be able to specify whether the associated rows representing one-level elements within the original XML document also be deleted. In this case, the default behaviour should be not to delete the associated rows because the data in the rows may be used in another context; for example, the original XML document may be used as a data transport mechanism from another system whose principal objective is to move data into the RDBMS.

Referential constraints may be implemented by using a "trigger" (a stored procedure associated with a table which the RDBMS automatically executes before, after or instead of events affecting a table, such as a deletion). For example, a user can define a referential integrity constraint from an RDBMS data table to an ODXML object by defining a trigger which (1) looks up the XMLDescriptor dictionary and retrieves all possible path expressions for the table, preferably using a reverse index having the schema (TableName, path) for efficiency; (2) using the retrieved path expression(s) and the primary key for the row to be deleted, query the XML table(s) to determine if any ODXML objects refer to that row; and (3) perform the user-designated or default action; e.g. reject the deletion.

Updating XML data stored in the RDBMS is performed much like the query as discussed above: an XML object is selected and its values are updated. Constraints should be applied when an attempt is made to update data whose primary key property is set, with the default behavior being that, when a primary key value in an RDBMS row is updated, the affected primary key value stored in the ODXML skeleton is also updated.

It is to be understood that the specific methods which have been described are merely illustrative of one application of the principles of the invention. Numerous modifications may be made by those skilled in the art without departing from the true spirit and scope of the invention.

What is claimed is:

1. A method for storing an XML document in a relational database system which comprises, in combination, the steps of:
    parsing the character data in said XML document to identify characters representing data values within at least some of the elements of said XML document,
    storing each of said data values in a specified column location in one or more specified rows of one or more specified tables in said relational database system,
    removing at least some of said characters representing data values from said XML document and storing the remainder of said XML document in said relational database system as an XML skeleton which defines the structure of said XML document and which contains the same characters as the XML document but with said characters representing data values omitted,
    thereafter reconstructing said XML document by merging the data content of said specified rows with said XML skeleton.

2. The method set forth in claim 1 wherein the data value stored in each of said specified column locations is obtained from a leaf element of said XML document which contains no sub element, and the data values stored in each given one of said specified rows is obtained from an XML element which contains one or more of given ones of said leaf elements, the data values in said given ones of said leaf elements are stored in columns in said given one of specified rows.

3. The method set forth in claim 2 further includes the step of storing data describing the properties of at least selected ones of said data values.

4. The method set forth in claim 3 wherein said properties include the designation of one or more of said data values as a primary key for use by said relational database system.

5. The method set forth in claim 4 wherein said properties further include the designation of the data type for at least some of said data values.

6. The method set forth in claim 5 wherein said properties further include the designation of one or more of said data values as indexing values.

7. The method set forth in claim 1 further including the step of designating one or more of said elements of said XML document as static elements and for identifying said static elements during said step of removing at least some of said data values to prevent removal of the data values in said static elements so that characters in said XML document representing data values in said static elements are retained in said XML skeleton.

8. A method for storing an XML document as set forth in claim 1 further comprising the step of performing a relational database operation to modify the data value stored in at least one of said column locations such that the step of reconstructing said XML document produces a modified XML document.

9. The method for storing an XML document as set forth in claim 4 wherein said step of storing data describing the properties of at least selected ones of said data values comprises means for storing an XML Descriptor which includes information obtained from the document type definition (DTD) associated with said XML document.

10. The method set forth in claim 9 wherein said XML Descriptor further specifies one or more of the elements of said XML document which contain primary key data values, and wherein said step of removing at least some of said data values does not remove said primary key data values but instead retains said primary key values in said skeleton.

11. The method set forth in claim 10 wherein said XML Descriptor further specifies the data type of the data values in one or more specified elements of said XML document.

12. The method set forth in claim 11 wherein said XML Descriptor further identifies one or more of said data values as indexed data values.

* * * * *

UNITED STATES PATENT AND TRADEMARK OFFICE
CERTIFICATE OF CORRECTION

PATENT NO.         : 7,287,216 B1
APPLICATION NO. : 09/583245
DATED                 : October 23, 2007
INVENTOR(S)       : Lee et al.

It is certified that error appears in the above-identified patent and that said Letters Patent is hereby corrected as shown below:

On the Title page, in field (75), in "Inventors", in column 1, line 4, after "Paul" insert -- I. --.

In column 1, lines 20-21, delete "echnologies" and insert -- technologies --, therefor.

In column 2, line 60, delete "so" and insert -- also --, therefor.

In column 2, line 65, delete "an" and insert -- and --, therefor.

In column 4, line 26, delete "Simlarly," and insert -- Similarly, --, therefor.

In column 4, line 34, delete ""<lastnamethe" and insert -- "<lastname>" the --, therefor.

In column 4, line 38, before "from" insert -- elements --.

In column 6, line 31, before "stored" delete "(".

In column 7, line 2, delete "gemerated" and insert -- generated --, therefor.

In column 7, line 55, delete "recontructs" and insert -- reconstructs --, therefor.

In column 8, line 30, delete "TABLE- Support." and insert -- TABLE_Support. --, therefor.

UNITED STATES PATENT AND TRADEMARK OFFICE
CERTIFICATE OF CORRECTION

PATENT NO. : 7,287,216 B1
APPLICATION NO. : 09/583245
DATED : October 23, 2007
INVENTOR(S) : Lee et al.

It is certified that error appears in the above-identified patent and that said Letters Patent is hereby corrected as shown below:

In column 10, line 8, in Claim 2, after "of" insert -- said --.

In column 10, line 39, in Claim 9, delete "claim 4" and insert -- claim 3 --, therefor.

Signed and Sealed this

Twenty-fourth Day of June, 2008

JON W. DUDAS
*Director of the United States Patent and Trademark Office*